United States Patent [19]

Breaux et al.

[11] Patent Number: 5,360,293
[45] Date of Patent: Nov. 1, 1994

[54] IN-GROUND BARRIER MEMBER INTERLOCKING JOINT AND SEAL SYSTEM

[75] Inventors: Louis B. Breaux, Marrero, La.; Leonard F. Sansone, Andover, N.J.

[73] Assignee: Barrier Member Containment Corporation, Gretna, La.

[21] Appl. No.: 986,241

[22] Filed: Dec. 4, 1992

Related U.S. Application Data

[63] Continuation-in-part of Ser. No. 831,555, Feb. 5, 1992, Pat. No. 5,240,348, which is a continuation of Ser. No. 398,613, Aug. 25, 1989, Pat. No. 5,106,233.

[51] Int. Cl.$^5$ .......................... E02D 5/00; B09B 1/00
[52] U.S. Cl. .................................. 405/267; 405/274; 405/278; 405/279; 405/128
[58] Field of Search ............... 405/266, 267, 262, 258, 405/274–281

[56] References Cited

U.S. PATENT DOCUMENTS

| | | |
|---|---|---|
| 785,274 | 3/1905 | Schleussner . |
| 910,421 | 1/1908 | Schlueter . |
| 1,007,718 | 11/1911 | McGill . |
| 1,679,319 | 7/1928 | Marshall ...................... 405/274 |
| 1,713,675 | 5/1929 | Parish . |
| 1,937,758 | 12/1933 | Harris . |
| 2,101,285 | 12/1937 | Stevens . |
| 2,232,845 | 2/1941 | Fieroh . |
| 2,355,102 | 8/1944 | Odman . |
| 2,937,065 | 5/1960 | Harza . |
| 2,961,731 | 11/1960 | Buzzell et al. . |
| 3,302,412 | 2/1967 | Hunsucker . |
| 3,326,003 | 6/1967 | Marconi . |
| 3,411,305 | 11/1968 | Cella . |
| 3,422,627 | 1/1969 | Courte . |
| 3,465,532 | 9/1969 | Belden ...................... 405/275 |
| 3,479,827 | 11/1969 | Morrice . |
| 3,593,528 | 7/1971 | Pavese . |
| 3,839,871 | 10/1974 | Dyer et al. . |
| 3,848,855 | 11/1974 | Weiland ...................... 256/73 |
| 3,864,921 | 2/1975 | Marx et al. . |
| 3,886,705 | 6/1975 | Cornland ...................... 52/586 |
| 4,059,964 | 11/1977 | Pavese . |
| 4,090,365 | 5/1978 | Nieber . |
| 4,145,891 | 3/1979 | Krings ...................... 405/282 |
| 4,182,087 | 1/1980 | Schall et al. ...................... 405/278 X |
| 4,194,855 | 3/1980 | Egger ...................... 405/128 |
| 4,259,028 | 3/1981 | Cook ...................... 405/282 |
| 4,358,221 | 11/1982 | Wickberg ...................... 405/128 |

(List continued on next page.)

FOREIGN PATENT DOCUMENTS

| | | |
|---|---|---|
| 455857 | 3/1950 | Italy . |
| 5833649 | 2/1983 | Japan . |
| 32808 | 4/1934 | Netherlands ...................... 405/278 |

OTHER PUBLICATIONS

*GUNDLE,* 1991 distributed by Gundle Lining Systems, Inc. of Houston, Tex.

*Primary Examiner*—Dennis L. Taylor
*Attorney, Agent, or Firm*—Joseph T. Regard

[57] ABSTRACT

A joint/sealing system for interlocked, in-ground barrier members which form an in-ground containment wall, including a "U" shaped gasket (108) interfacing with a longitudinally extended male member (109) to form oppositely directed, double seals using outwardly diverging lips (181/182, 183/184) on the distal ends of the gasket, with the seals being created between at least one side of the male member and at least one leg of two legs (107), which form a female cavity (110) for the male member. The joint includes two, flanking "T" shaped, longitudinal extensions on opposite sides of the male member mating with opposed "T" configured chambers (102') on the adjacent barrier member. The joint elements preferably form an "H" nested within two, opposed "J" shapes. Six exemplary embodiments are disclosed, some single wall and some double walled. The gasket lips typically emanate out from the ends of the "U" shape, but one embodiment (501) has the lips extending out from the sides of the "U" (FIG. 10 ).

25 Claims, 13 Drawing Sheets

U.S. PATENT DOCUMENTS

| | | | |
|---|---|---|---|
| 4,376,599 | 3/1983 | Krings | 405/282 |
| 4,407,612 | 10/1983 | van Weele | 405/285 |
| 4,419,030 | 12/1983 | Burkemper | 405/278 |
| 4,453,336 | 6/1984 | Piccagli | 52/742 |
| 4,453,861 | 6/1984 | Bretz et al. | 405/267 |
| 4,484,835 | 11/1984 | van Klinken | 405/52 |
| 4,519,729 | 5/1985 | Clarke, Jr. et al. | 405/258 |
| 4,537,536 | 8/1985 | Tsubonuma et al. | 405/267 |
| 4,601,615 | 7/1986 | Cavalli | 405/267 |
| 4,607,981 | 8/1986 | van Klinken | 405/52 |
| 4,657,442 | 4/1987 | Krings | 405/282 |
| 4,659,260 | 4/1987 | Morelli | 405/283 |
| 4,664,560 | 5/1987 | Cortlever | 405/258 |
| 4,671,705 | 6/1987 | Nussbaumer et al. | 405/267 |
| 4,673,316 | 6/1987 | Nussbaumer et al. | 405/267 |
| 4,679,965 | 7/1987 | Glaser et al. | 405/258 |
| 4,687,372 | 8/1987 | Thornton | 405/128 |
| 4,690,588 | 9/1987 | Berger | 405/278 X |
| 4,697,953 | 10/1987 | Nussbaumer et al. | 405/128 |
| 4,741,644 | 5/1988 | Cavalli et al. | 405/50 |
| 4,753,551 | 6/1988 | Brueggemann et al. | 405/128 |
| 4,797,158 | 1/1989 | Harriett | 106/74 |
| 4,808,039 | 2/1989 | Fischer | 405/281 |
| 4,909,674 | 3/1990 | Konno et al. | 405/267 |
| 4,917,543 | 4/1990 | Cole et al. | 405/262 |
| 4,927,297 | 5/1990 | Simpson | 405/270 |
| 4,929,126 | 5/1990 | Steenbergen et al. | 405/267 |
| 4,981,394 | 1/1991 | McLaren et al. | 405/129 |
| 4,993,880 | 2/1991 | Collins | 405/283 |
| 5,013,185 | 5/1991 | Taki | 405/128 |
| 5,096,334 | 3/1992 | Plank | 405/283 |
| 5,106,233 | 4/1992 | Breaux | 405/278 X |

IN-GROUND BARRIER MEMBER INTERLOCKING JOINT AND SEAL SYSTEM

REFERENCE TO RELATED APPLICATIONS

This application is a continuation-in-part of pending patent application Ser. No. 07/831,555 filed Feb. 5, 1992, entitled "Hazardous Waste Containment System", now U.S. Pat. No. 5,240,348 which application in turn is a continuation of patent application Ser. No. 398,613, filed Aug. 25, 1989 and issued as U.S. Pat. No. 5,106,233 on Apr. 21, 1992, the disclosures of which applications are incorporated herein by reference.

Applicant Breaux in connection with another co-inventor (Lloyd R. Moffett, Sr.) is concurrently filing an application entitled "Guide Box Assembly System for In-Ground Barrier Installation," the disclosure of which is likewise incorporated herein by reference.

TECHNICAL FIELD

The present invention relates to barrier members in the form of a series of adjacent barrier sheets or members joined together in-line in the ground, and more particularly to the interlocking joint(s) and associated seal(s) between them.

BACKGROUND ART

As described in the grandparent U.S. Pat. No.(5,106,233) of the present invention, a plurality of barrier members may be connected together and buried in the ground to provide a surrounding containment barrier interfacing with, for example, an underlying strata of clay or the like, to effectively isolate, for example, hazardous wastes from the surrounding ground. Such a system, which effectively isolates ground on one side of the wall from ground on the other side of the wall, can be used, for example, to prevent the migration and leaching of hazardous fluid substances into, e.g., the water table.

In order for such a system to be effective and reliable, it is highly important to provide a secure, long-term seal between the juxtaposed barrier members to prevent any leakage of the contained substances from flowing or migrating between the adjacent, interconnected barrier members, which would otherwise allow the wastes to circumvent their containment. It is also highly important that the interconnections themselves be mechanically strong and reliable on a long-term basis.

A list of prior patents which may be of interest is presented below:

| Patent No. | Patentee(s) | Issue Date |
|---|---|---|
| 785,274 | Schleussner | 03/1905 |
| 910,421 | Schleussner | 01/1909 |
| 2,101,285 | Stevens | 12/07/1937 |
| 2,232,845 | Fieroh | 02/1941 |
| 2,937,065 | L. Harza | 05/17/1960 |
| 2,961,731 | Buzzell et al | 11/29/1960 |
| 3,302,412 | Hunsucker | 02/07/1967 |
| 3,326,003 | Marconi | 06/1967 |
| 3,411,305 | A. Cella | 11/19/1968 |
| 3,422,627 | Courte | 01/1969 |
| 3,839,871 | Dyer et al | 10/1974 |
| 3,848,855 | Weiland | 11/19/1974 |
| 3,886,705 | Cornland | 06/03/1975 |
| 4,059,964 | Pavese | 11/1977 |
| 4,358,221 | Wickberg | 11/1982 |
| 4,376,599 | Krings | 03/1983 |
| 4,414,030 | Burkemper | 12/1983 |
| 4,453,366 | Piccagli | 06/1984 |

-continued

| | | |
|---|---|---|
| 4,519,729 | Clarke et al | 04/1985 |
| 4,601,615 | Cavalli | 07/1986 |
| 4,664,560 | Cortlever | 05/1987 |
| 4,687,372 | Thornton | 08/1987 |
| 4,741,644 | Cavalli et al | 05/1988 |
| 4,808,039 | Fischer | 02/28/1989 |
| Foreign Patent Docs. | | |
| Japan | 58-33640 | S. Takahashi |
| Japan | 56-70322 | H. Kazuhara |
| Italy | 455857 | |

With respect to the interconnecting of two in-ground barrier members, several of the above referenced patents may be considered particularly pertinent to the present invention. Note, for example, U.S. Pat. 4,664,560, as well as a flyer publication entitled Gundle ® bearing a copyright (©) notice of 1991 and distributed by Gundle Lining Systems, Inc. of Houston, Tex., a copy of which is being filed with the U.S. Patent & Trademark Office in connection with this application.

With respect to the "Gundle" publication, it is not clear that this is prior art because the date of first publication or use of the illustrated system is not known to Applicants and its 1991 copyright notice date is well after the filing date of the instant application's grandparent '233 U.S. Pat. filed Aug. 25, 1989.

It is also noted that the seal and joint generally shown in the publication is no more relevant than that shown in the '233 grandparent case filed in 1989, which disclosed a similar seal and joint. The present invention is directed to a joint and seal system which is substantially improved and patentable over both the grandparent disclosure, as well as the Gundle publication's disclosure.

With respect to the Cortlever U.S. Pat. No. 4,664,560, which is also similar in general approach to that of the grandparent patent and the Gundle publication, the following differences, inter alia, from the present invention are noted. The preferred embodiments of the invention preferably employ a somewhat U-shaped packing gasket (note, for example, FIGS. 4, 8 & 11 hereof) designed in such a way that they can accommodate a great deal of distortion without leakage. Due to this design the preferred joints of the invention become tighter under tension and are not affected by compression on the joints.

In contrast, Cortlever employs a poured-in mastic, hot wire heat fusion or a water expandable seal. The first two techniques are not very reliable under field conditions where the surfaces are likely to be dirty. Additionally, there is some question how well such a water expandable seal will work when subjected to alternate drying and wetting.

Comparing the joint design of the second, alternate embodiment (i.e. FIG. 5) of the present invention to that of the most preferred embodiment (FIGS. 2 & 3 hereof), a twenty (20%) percent improvement in strength was achieved by the interlocking lugs utilized in the latter design. It should be note that these types of lugs are not employed by Cortlever.

Likewise the present invention does not employ nor need to employ Cortlever's guide ridges 3 (see its FIG. 5), as the body of the male connector of the preferred embodiments of the invention can be guided directly.

Other of the above listed patent documents disclose other forms of joints, some of which are "knuckle" type joints (note, for example, U.S. Pat. 4,808,039), which are clearly and patentably distinguishable from the present invention and not as relevant as the in-ground joint and seal approaches discussed above.

Thus, in comparison to the prior art the present invention provides a long-term reliable, practical, and cost effective solution to the prior art problems of joining and sealing the interfacing engagement between two, interconnected, in-ground barrier members.

Some further additional patents of interest are listed below:

| Patent No. | Patentee(s) | Issue Date |
|---|---|---|
| 1,007,718 | J. I. McGill | 11/07/11 |
| 1,713,675 | R. L. Parish | 05/21/29 |
| 1,937,758 | F. R. Harris | 12/05/33 |
| 2,355,102 | O. R. Odman | 08/08/44 |
| 3,302,412 | W. A. Hunsucker | 02/07/67 |
| 3,479,827 | A. R. S. Morrice | 11/25/69 |
| 3,593,528 | J. R. Pavese | 07/20/71 |
| 3,864,921 | Marx et al | 02/11/75 |
| 4,059,964 | Pavese | 11/29/77 |
| 4,090,365 | Nieber | 05/23/78 |
| 4,145,891 | Krings | 03/27/79 |
| 4,194,855 | Egger | 03/25/80 |
| 4,259,028 | Cook | 03/31/81 |
| 4,407,612 | van Weele | 10/04/83 |
| 4,453,861 | Bretz et al | 06/12/84 |
| 4,484,835 | van Klinken | 11/27/84 |
| 4,519,729 | Clarke, Jr. et al | 05/28/85 |
| 4,537,536 | Tsubonuma et al | 08/27/85 |
| 4,607,981 | van Klinken | 08/26/86 |
| 4,657,442 | Krings | 04/14/87 |
| 4,659,260 | Morelli | 04/21/87 |
| 4,664,560 | Cortlever | 05/12/87 |
| 4,671,705 | Nussbaumer et al | 06/09/87 |
| 4,673,316 | Nussbaumer et al | 06/16/87 |
| 4,679,965 | Gläser et al | 07/14/87 |
| 4,697,953 | Nussbaumer et al | 10/06/87 |
| 4,741,644 | Cavalli et al | 05/03/88 |
| 4,753,551 | Brueggemann et al | 06/28/88 |
| 4,797,158 | Harriett | 01/10/89 |
| 4,808,039 | Fischer | 02/28/89 |
| 4,909,674 | Konno et al | 03/20/90 |
| 4,917,543 | Cole et al | 04/17/90 |
| 4,927,297 | Simpson | 05/22/90 |
| 4,929,126 | Steenbergen et al | 05/29/90 |
| 4,981,394 | McLaren et al | 01/01/91 |
| 4,993,880 | Collins | 02/19/91 |
| 5,013,185 | Taki | 05/07/91 |
| 5,096,334 | Plank | 03/27/92 |

The '718, '675, '758, '412, '039, '543 and '394 patents are considered to be more pertinent to the sealing aspects of the invention; the '827, '528, '921, '964, '365, '891, '028, '442, '260 and '334 patents are directed to various types of "trench boxes;" the '855, '612, '835, '861, '729, '536, '981, '705, '3 16, '965, '953, '644, '55 1, '158, '039, '297, '126, '880 and '185 patents are considered to be more pertinent to the over-all system of the invention; while the '102, '412, and '126 patents are considered to be more pertinent to various profiles used in various types of male/female joints used in a number of different items, some non-analogous to the present invention and all of which are significantly different from those used in the present invention, particularly those uses in the interconnecting joints between the barrier members of the present invention.

With regard to "trench boxes", the prior art has contemplated numerous configurations for trench wall shoring devices and the like for preventing excavation cave-in, as evidenced by the sampling of patents noted above.

For example, U.S. Pat. 4,659,260 issued in 1987 for a "Trench Box" discloses a system to prevent the caving in of an excavated area, providing a reinforced shoring system. However, the guide box assembly of the present invention, which contemplates a slotted mechanism specifically configured for installing the barrier containment members of the present invention, teaches a mechanical installation system fully distinguishable from the '260 patent.

U.S. Pat. 4,090,364 to Nieber discloses a "Portal Frame for Trench Box Stack" wherein there is provided an easily assembled and disassembled system, but which nonetheless does not teach nor contemplate the mechanical aspects or template system or methodology of the present invention.

U.S. Pat. 4,059,964 issued in 1977 discloses an opposed, support wall system for the installation of trench wall sheeting in side open areas in the wall system, which are positioned against the side walls of the excavation in which the trench wall sheeting is being installed. This system, while pertinent, is nonetheless fully distinguishable from the present system, as it does not teach nor contemplate the mechanical interrelationship or methodology of the present invention.

The other patents noted are likewise distinguishable from the present invention but are included to illustrate the state of the art. In summation, the guide box assembly system of the present invention does have substantial novelty with regard to the known trench box art above, especially with regard to the mechanical aspects of the invention as utilized in the installation of the barrier member containment system of the invention.

Most of the patents noted as being pertinent to the over-all system of the invention teach or contemplate a system for containing or preventing the lateral migration of fluids through the soil via fluid impermeable fabric or plastic sheeting subterranean structures or the like.

These patents typically rely upon a bentonite slurry or similar liquid means of preventing the caving in of the excavated area, and are thereby much more expensive to install when compared to the present invention. Further, these systems are distinguishable in their interlocking means for the various barrier members, which include systems which do not even contemplate a sealed connection along the various joined members, substantially reducing, if not eliminating, any reliable containment of toxic fluid wastes.

U.S. Pat. 4,679,965 to Gläser et al entitled a "Method and Apparatus for Installing Panels into Recesses in the Ground" discloses a containment system wherein a trench is excavated and filled with the slurry, and large high density polyethylene (HDPE) sheets are engaged through slotted arrangements in the trench to form a barrier. This system is distinguishable from the present system, as it utilizes a different profile, no seal, and no guide box assembly in the installation.

The noted patents further include unusual devices for excavating areas for the installation of containment systems, such as, for example, U.S. Pat. 5,013,185, issued in 1985 to Osamu Taki for a "Multi-Shaft Auger Apparatus and Process for Fixation of Soils Containing Toxic Wastes", as well as other similar excavation systems. For another multi-auger apparatus, note U.S. Pat. 4,537,536 to Tsubonuma et al for a "Process and Apparatus of Constructing a Water Tight Underground Pile Wall ".

For a solid barrier containment system, see U.S. Pat. 4,407,612 to van Weele, which discloses a partially load bearing wall comprised of curved concrete shell members, connected via spreader joints. This patent is readily distinguishable from the present invention, as it teaches a totally different structure, operation, and installation from the present invention.

U.S. Pat. 4,453,861 to Bretz et al teaches an in situ system for pouring concrete to form barrier containment walls and is likewise readily distinguishable from the present invention.

With regard to the noted seal and the male/female profile patents, there is included various sealing means for panel members and other pertinent systems. For example, Cortlever U.S. Pat. No. 4,664,560 issued in 1987 teaches a subterranean containment system wherein there is provided (note FIG. 3) a heat activated seal for preventing the lateral migration of liquid therethrough. The system as taught is clearly distinguishable from a patentability standpoint.

U.S. Pat. 4,917,543 issued in 1990 teaches a "Wall System Employing Extruded Panel Sections" wherein there is taught a connector element (25) which may also act to seal the various installed panels. Again, however, this system is distinguishable from the present invention.

U.S. Pat. 3,302,412 issued in 1967 discloses a lug member 30 (note FIG. 2) configured to space the sheet piling into a proper interlocking installation. Also taught is the disposition of a sealant (36, FIG. 7) for preventing leakage of the system. Again, however, this is still just another profile and seal means which is clearly distinguishable from the present invention.

The Simpson '297 patent forms an impermeable barrier in an excavation made down to bedrock to contain waste materials in the ground, in which a sheet of impervious material, such as a fabric carrying a substantially dehydrated sodium-bentonite clay, is placed along the side walls of the excavation, and the rest of the excavation is then filled with concrete.

The van Klinken '835 & '981 patents are directed to waste containment systems in which "more or less flexible sheets or foils" are introduced into the soil by means of a "lance."

In the Nussbaumer et al '953 patent a fluid sealing material is introduced through pipes into the ground which thereafter solidifies, sealing the wastes in a dump. The Brueggemann et al patent likewise uses a piping system to provide "a sealing screen for waste dumps." The Nussbaumer et al '316 patent uses slotted wall connections which must be flushed out prior to using plastic foil sealing elements for sealing two adjacent barrier wall sections.

In the Cavalli '644 patent initially vertical coupling members are formed in spaced bore holes in the ground, with the space between them excavated, and then a sandwich of high density polyethylene sheets with an internal mesh is connected between the coupling members, forming an "environmental cut-off and drain." In the Clarke et al '729 patent a trench is made and a series of membrane fluid barriers are placed in it suspended between slotted ends connectors.

The Konno et al '674 patent forms "an underground continuous water-impervious wall" by rolling out an impervious sheet of material into a trench and charging a hardening material against the opposite side surfaces of the impervious and allowing the material to harden. In the Steenbergen et al patent a screen of flexible material is fed into a trench typically in a folded over fashion, with the top of the fold being held up by appropriate means in the untilled trench.

The Cortlever '560 patent, referred to above in connection with seals, also discloses the use of dam wall sheets (1) of stainless steel or of a synthetic resin are sequentially inserted into the ground using a enclosing, vibrating, injection guide (19) aided by earth loosening water jets (29), with one sheet being vertically engaged with the preceding dam sheet via male/female edge joints which are slid together. After one dam sheet is inserted into the ground, the vibratory injection guide is withdrawn to then be used for the next dam sheet.

The presence of all of these diverse, attempted "solutions" of the past to the challenge of forming an impermeable barrier about a waste area to be contained and the prior existence for many years of the various means used in the present invention to successfully meet this challenge provide further objective indicia or evidence of the "unobviousness" and patentability of the invention.

GENERAL DISCUSSION OF INVENTION

Thus, the present invention is directed to providing a long-term reliable, practical, and cost effective solution to the prior art problems of securing and reliably joining and sealing the interfacing engagement between two, interconnected, in-ground barrier members.

It achieves this by providing a joint/sealing system for interlocked, in-ground barrier members which form an in-ground containment wall, including preferably a "U" shaped gasket interfacing with a longitudinally extended male member to preferably form oppositely directed, double seals using outwardly diverging lips on the distal ends or sides of the gasket, with the seals being created between at least one side of a centrally located male member and at least one leg of two legs which form a female cavity for the male member. The primary sealing surfaces are actually provided linearly at the side edges of the tips of the diverging lips.

The joint also preferably includes two, flanking, preferably "T" shaped, longitudinal extensions on opposite sides of the male member (or, alternatively, the female member), preferably mating with opposed, "T" configured chambers on the adjacent barrier member. The joint elements preferably form an "H" nested within two, opposed "J" shapes.

Six exemplary embodiments are disclosed, some having a single wall design and some being double walled.

The gasket lips typically emanate out from the ends of the "U" shape, but one embodiment has the lips extending out from the sides of the "U" or the ends, if the shape is considered to be straight rather than "U" shaped.

A final embodiment uses a more simplified design using two opposed, separated sealing members positioned on opposite sides of the distal end of the male member, rather than a "U" shaped gasket, which sealing members preferably are co-extruded with the main body of its associated coupling element. This embodiment also provides an example of using main wall unit having the same male/female coupling element at its side edges which are joined together using an intermediate coupling member, likewise having the same female/male coupling element at its side edges but of a type opposite to that used on the main wall units.

It is thus a basic object of the present invention to provide a long-term reliable, practical, and cost effective solution to the prior art problems of joining and sealing the interfacing engagement between two, interconnected, in-ground barrier members.

It is respectfully believed that the present invention has provided a significant contribution to the very "useful art" of in-ground barrier wall isolation systems.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

Figure 1:
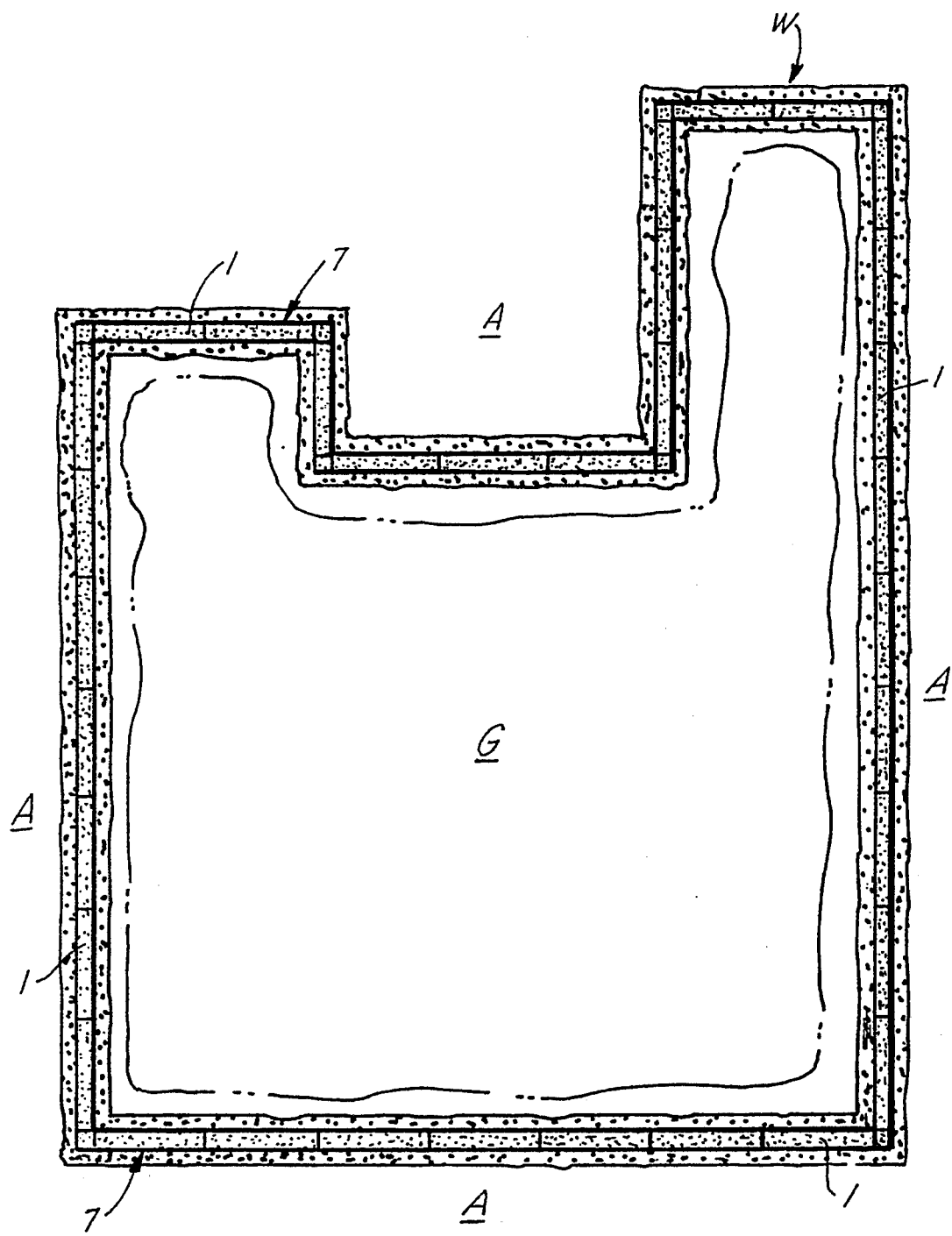
FIG. 1 is a plan, generalized or simplified view of an exemplary in-ground barrier containment system including a series of vertically arrayed, edge-to-edge interconnected barrier members with which the present invention can be used.

It should be understood that, in each of the foregoing figures, each of the illustrated elements and the illustrated joint and sealing members are vertically extended down into the plane of the drawing for a vertical dimension consistent with the desired height for the containment wall W and its various barrier members (101–601).

MODES FOR CARRYING OUT THE INVENTION

Containment Barrier (FIG. 1)

As can be seen in the simplified, generalized FIG. 1, the exemplary embodiment of the general containment system, with which the present invention can be used, includes a series of interconnected, adjacent, associated barrier members 1 slidingly engaged to form a subterranean, vertical, sealed barrier wall W. The barrier wall W stands on and penetrates an underlying, impermeably strata (e.g. clay), the two in combination isolating the ground and its contents G, which can include, for example, toxic wastes, from the surrounding area A. The vertical height of the containment wall W may be of the order of five to forty (5–40') feet or more, depending on depth of the underlying impermeable layer.

For a further understanding of these types of barrier containment systems and how they can be installed down in the ground, reference is had to the grandparent '233 patent and the concurrently filed Breaux/Moffett application.

However, it should be understood that one barrier member 1 is preferably slid down into interconnection with the other, adjacent, preceding one, using the male/female joint and associated seals described more fully below, as part of their in-ground installation. A guide box assembly, such as the ones described in the above related patent references, which temporarily isolates the barrier members 1 from the surrounding ground G/A, preferably is used to guide and hold the various, constituent, barrier members 1 as they are interconnected together to ultimately form the completed containment wall W. If needed, lubricants can be used to assist in sliding the joint coupling and gasket elements of the barrier members 1 with respect to one another.

Figure 2:
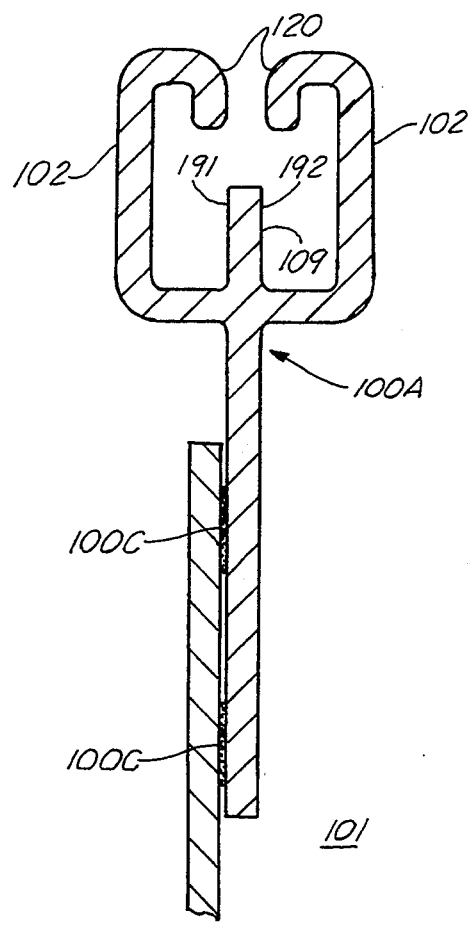
FIG. 2 is a plan view of a first, exemplary, individual, flat or sheet-type barrier member incorporating a first exemplary, preferred embodiment of the seal and joint system of the present invention, with one end having a male interconnecting joint element and the other end having a female, interconnecting joint element with its related sealing or gasket element.
Figure 2:
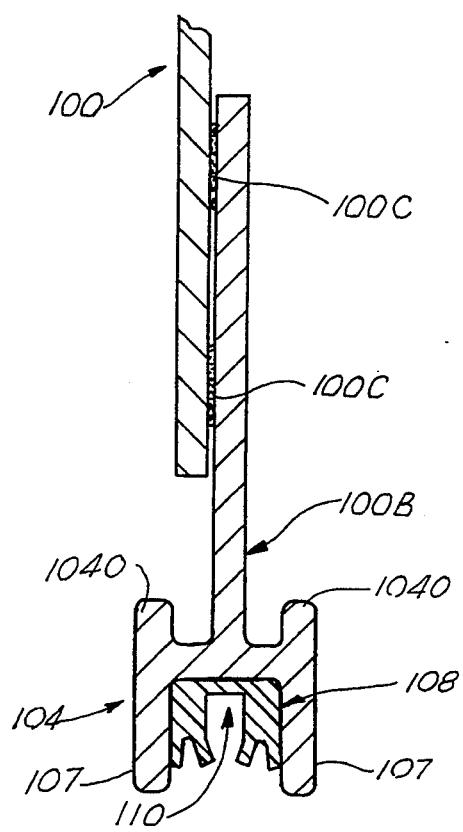
Figure 3:
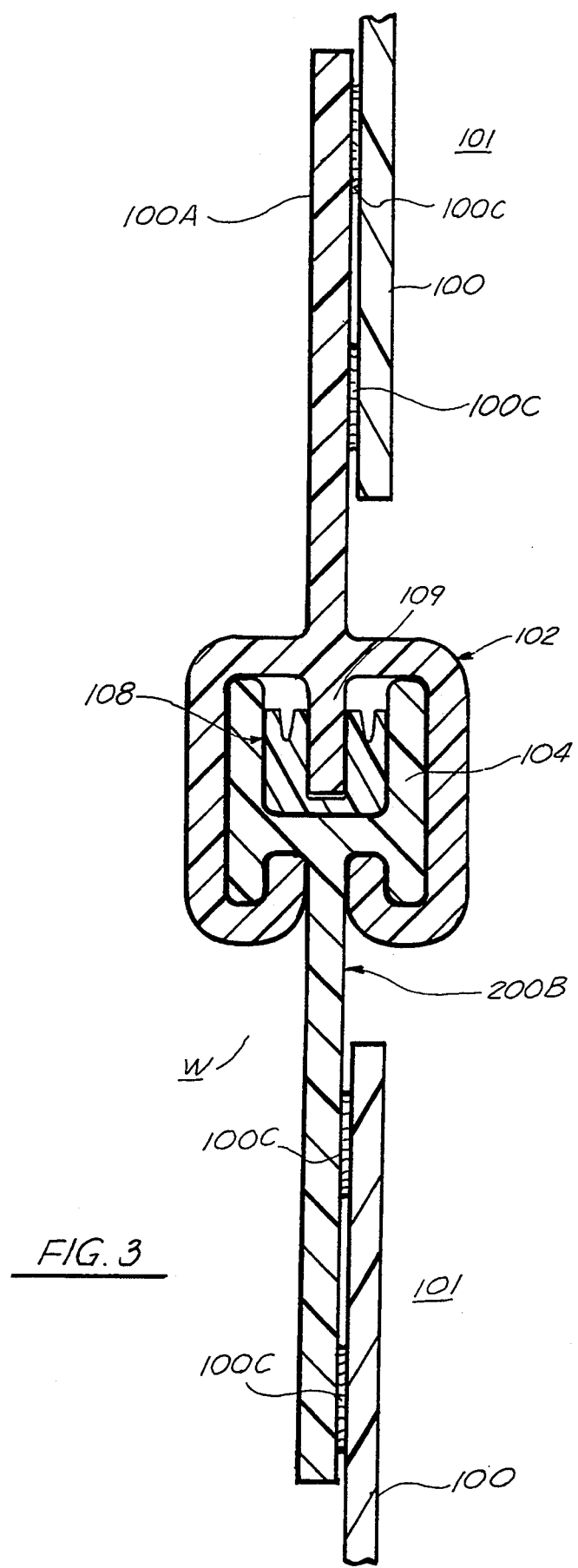
FIG. 3 is a plan view showing an assembled, sealed interconnection between two adjacent barrier members of the type of FIG. 2 using the joint and sealing elements of FIG. 2.

1st Joint/Seal Embodiment (FIGS. 2 & 3)

As can be seen in FIGS. 2 & 3, a first exemplary, preferred embodiment 101 for the containment barrier member 1 of the present invention includes a rectangular, single-wall, flat, main body sheet or section 100, which is assembled and joined together into a continuous, integrated in-ground, containment wall W with other like barrier members (see FIG. 1) by means of interlocking members 102 and 104.

The main body 100 includes two, connected coupling end pieces 100A & 100B affixedly connected at heat fused areas 100C. All three of these basic barrier wall elements can be made of, for example, extruded plastic made in the desired heights for the barrier members 101, e.g., ten (10'), fifteen (15') and twenty (20') foot heights. Exemplary plastic material for the barrier member 101 are medium (e.g. 0.934 g/cc density, ASTM) polyethylene or high density polyethylene (density great than 0.939 g/cc) polypropylene or possibly polyvinyl chloride (PVC) or other material inert to the materials to be confined by the barrier wall W or other thermoplastic material.

As can be seen in the assembly of FIG. 3, adjacent barrier members 101 employing essentially the same design (or an analogous design for a corner unit) are included on the opposite sides interconnected together to form a complete barrier of the size and configuration desired. This design preferably provides an interlocked joint (100A/100B, 102/104) having essentially the same as or greater strength than the main body member 100.

As can best be seen in FIG. 2, the coupling end element 100A has at its distal, coupling end a male coupling, including a centrally located, longitudinally extended male member 109 flanked by two, inwardly or laterally directed, "J" shaped members 102. The coupling end element 100B has at its distal, coupling end a female coupling, including a centrally located, longitudinally extended female chamber 110 formed by the interior of the sealing gasket 108 and two, longitudinally extended legs 107, which form part of the "H" shaped joint member 104.

When these two, male/female end pieces are mated and coupled together to opposite type end pieces on adjacent barrier wall sections 101, the "H" shaped piece 104 fits and nests within the opposed, "J" shaped members 102, with the tips of the "Js" curving around and holding in the lower legs of the "H". As can be seen in the assembled joint of FIG. 3, the combination provides in its coupling thickness five (5), parallel, flat, plate-like, relatively thin elements sandwiched together with the two (2), parallel legs of the "U" shaped gasket 108, described more fully below, namely the two (2), outside, side walls of the joint element 102, the two (2), enclosed legs of the "H" shaped joint element 104, and the centrally located, extended male member 109.

In order to prevent passage of fluid through the joint, an elastomeric gasket 108, preferably of the type known as U-packing (shown in the close-up view of FIG. 4 in its "natural," un-compressed state), is placed at the bottom of the female cavity 110 formed by the flanking, longitudinally extended, side members 107. The elastomeric material chosen for the gasket depends on the fluid being retained, with, for example, buna-n rubber being very suitable for water, but vinylidene fluoride hexaflouropropylene copolymer (e.g. "Viton" TM, for example, being preferred where corrosive chemicals are involved. A further exemplary material is "Santoprene" TM.

The sealing gasket 108 includes two seals, i.e. double seals, formed back to back by two pair of diverging, flexible lips 181/182 & 183/184 (note FIG. 4), so that pressure can be restrained in either direction. These pairs of diverging lips are located at and divergingly extend out from the distal ends 186 of the "U" shape of the gasket 108, and, as can be seen in FIG. 3, form oppositely directed seals at two spaced areas between opposite sides 191 & 192 of the distal end of said male member and opposed ones of the interior walls of the flanking female cavity legs 107. Although difficult to see in the view of FIG. 3 but as explained more fully below, there generally is no sealing engagement between the gasket 108 and the male member 109 or the joint element 102 in-line along the length of the gasket between its distal ends 186, but instead the seals occur only at the two spaced areas where the gasket lip pairs 181/182. & 183/184 fill the two gaps between opposite sides of the male member and the legs of the joint element 102 forming the female cavity.

The lateral width of the main body of the sealing gasket 108 at its distal ends 186A & B before the lips 181-184 begin is a bit less than the separation distance between the sides of the male member 109 and the interior sides of the interlocking element 102. On the other hand, the separation distance between the side edges 185A & B of the tips of the lips is greater than the separation distance between the sides of the male member 109 and the interior sides of the interlocking element 102.

As a result, the actual seal provided by the gasket 108 is somewhat linear, occurring at the edge tips 108A & B, which are being compressed, and their respective interfaces with the opposed walls of the male member 109 and the interlocking member 102 and extending down along the full vertical length of the barrier unit 101. As can be seen by the two direction arrows in FIG. 4, as pressure builds on either side of the double seal provided by the gasket 108, the diverging lips 181/182 (or 183/184, as the case may be) tend to be driven into further divergence, further tightening the seal. If desired and as illustrated, the preferably curved base or bottom 187 of the "U" shaped gasket 108 can have a greater width than the distal ends 186 for better, more stable seating, but, at least for the barrier embodiment 101 illustrated, it should still be significantly less than the total distance between the two, outer, tip edges 185A, so that the diverging lips 181-184 will be under compression when the joint and seal are fully assembled.

In order to prevent or at least retard any movement of the gasket 108 during installation of the barrier panels 101, the gasket is secured in place by means of, for example, an adhesive or by heat fusion when the gasket member is made from a thermoplastic elastomer which is compatible with the joint material. Installation is accomplished by sliding the adjacent, mating barrier members 101 together.

Applying a coating of vegetable soap to the gasket 108 facilitates assembly. Assembly is further facilitated by providing a sufficient gap between the joint interlocking members 102 and 104 to minimize frictional forces as the adjacent members are slid down with respect to one another. The gap should preferably be in the range of (0.015) to (0.030) inches.

This gap allows one barrier member 101 to move in relation to the one to which it is coupled. This movement has no effect on the seal, as the flexible gasket 108 moves inward or outward in the bottom area of the cavity formed by the longitudinally extended members 107, and a tight seal is maintained regardless of its position in the cavity.

The initial seal of the gasket is caused by compression of the gasket lips 181/182 & 183/184 between the distal sides 191 & 192 of the male member 109 and the bottom portions of the interior sides of the flanking members or legs 107. As pressure is applied to the internal U-shaped cavity, the seal becomes tighter.

The other exemplary embodiments will now be described. However, for the sake of brevity, because many of the elements are the same or analogously the same (in which case like reference numbers are used), a detailed description of all of them will not be provided, as such would merely be redundant.

Figure 5:
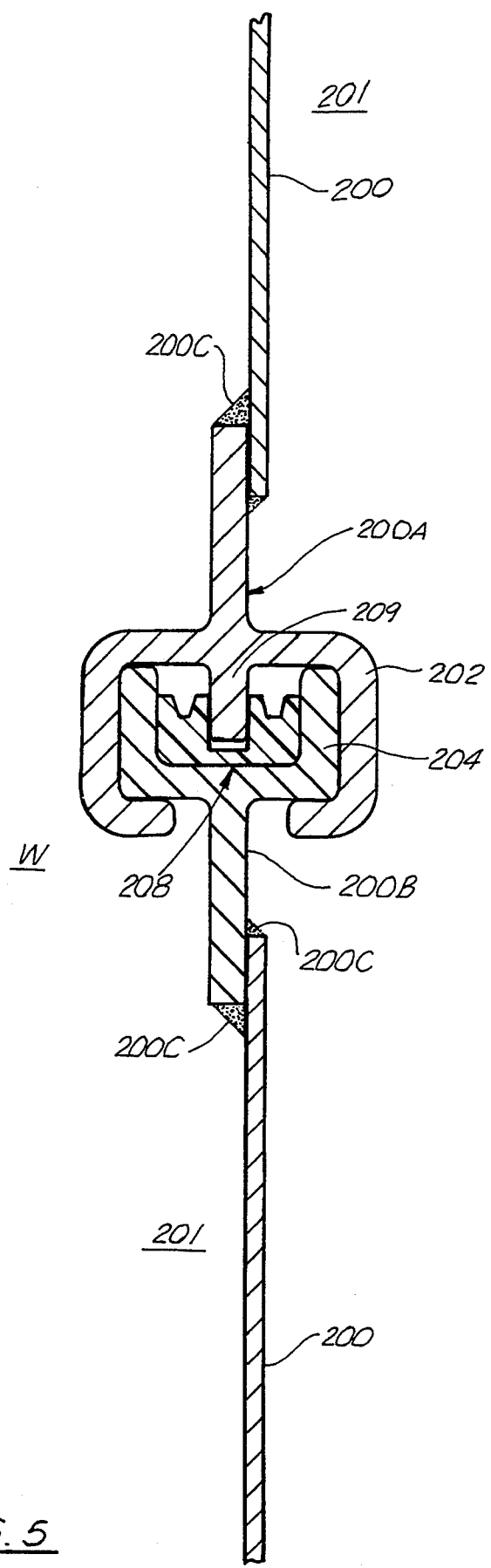
FIG. 5 is a plan view showing the sealed interconnection between two adjacent barrier members using an alternate, exemplary embodiment of the joint and sealing elements similar to but simpler and less strong than that of FIG. 2.

2nd Joint/Seal Embodiment (FIG. 5)

As can be seen in FIG. 5, a second, exemplary embodiment 201, very similar to the embodiment 101 of FIG. 3, for the containment barrier member 1 of the present invention is illustrated, as assembled as part of a continuous in-ground, containment wall W (see FIG. 1) with another like barrier member 201.

The primary difference between the two embodiments is in the particulars of the joint structure, wherein the female coupling end piece 201B has a "U" shape (vis-a-vis the "H" shape end piece 101B), while the male coupling end 201A is formed of two, opposed "L" shape extensions (vis-a-vis the opposed "J" shaped extensions 102), which together form a "C" shape. As can be seen, the "C" shape or "L" shaped extensions hold between themselves the "U" shaped coupling member 204, which is nested within it for a reasonably secure joint.

Because of the enhanced joint strength of the former, first embodiment 101, it is currently preferable to this second embodiment 201. Indeed, in comparing the joint design of FIG. 3 to that of FIG. 5, a twenty (20%) improvement in strength was provided by the addition of the interlocking, longitudinally extended, lugs 120/140 of the underside of the "H" shape and the boots and tips of the opposed "J" shapes.

The next three, exemplary embodiments described below are directed to double-wall units (vis-a-vis the single wall designs of FIGS. 3 & 5 (and FIG. 12 below). It is noted that the rectangular or squared-off double-wall embodiment of FIGS. 9–11 is described in greater detail than the cylindrical double-wall embodiments of FIGS. 6 & 7, the latter two embodiments using analogous numbering based on the numbering of the former, with the analogous items not being described in detail for the sake of brevity.

Figure 6:
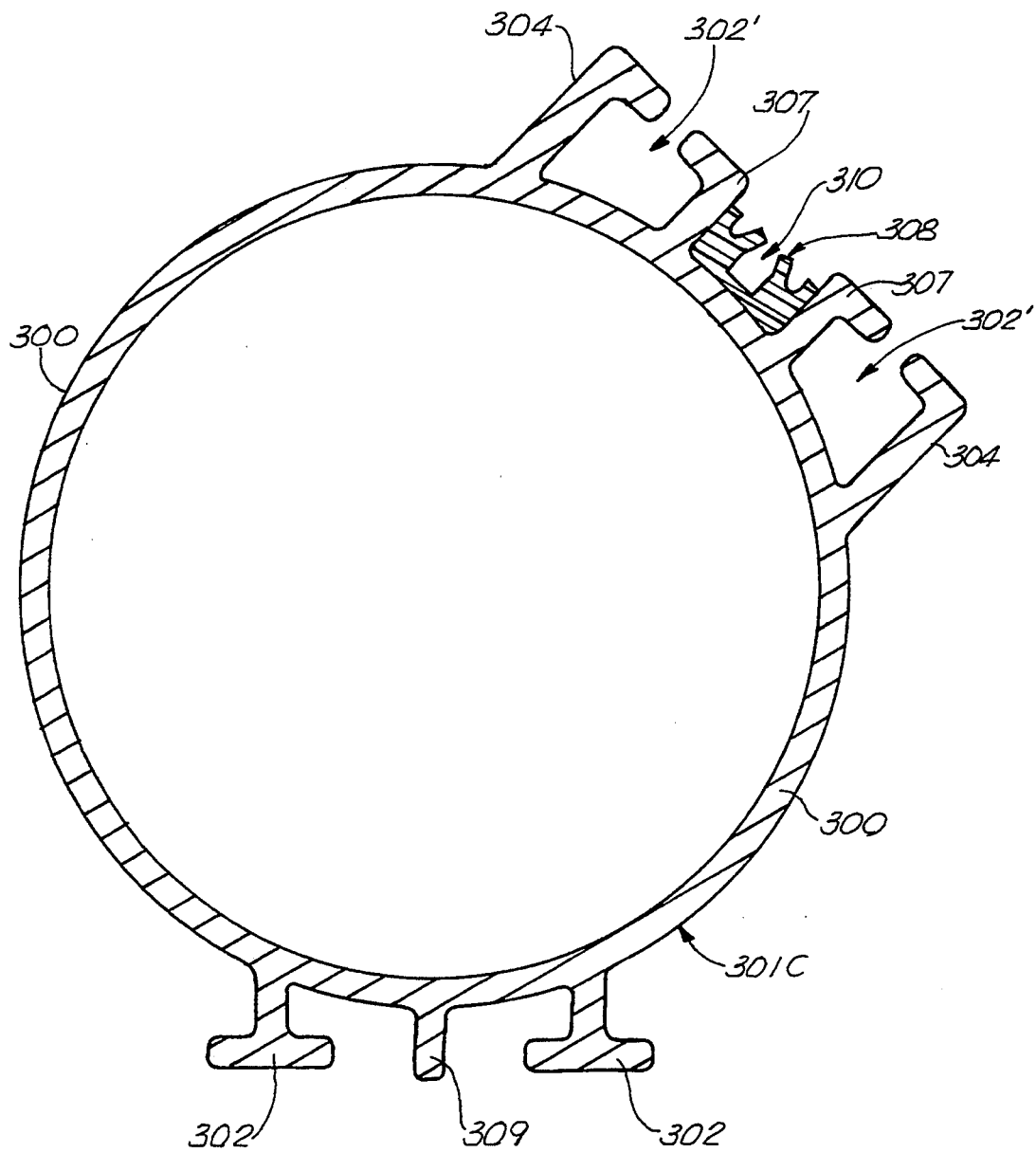
FIG. 6 is a plan view of an alternate, exemplary, cylindrical-type, expanded or double-walled, barrier member incorporating a further alternate embodiment of the seal and joint system of the present invention, with one peripheral area or "end" having a male interconnecting joint element and another peripheral area or "end" a female, interconnecting joint element with its related sealing or gasket element.

3rd Joint/Seal Embodiment (FIG. 6)

As can be seen in FIG. 6, a third exemplary embodiment 301C for the containment barrier member 1 of the present invention is illustrated which is assembled into a continuous in-ground, containment wall W (see FIG. 1) with other like barrier members 301/301C. The embodiment 301C illustrated is a cylindrical, double-wall (300), corner unit, used for making an exemplary forty-five (45°) degree turn in the containment wall W.

Figure 9:
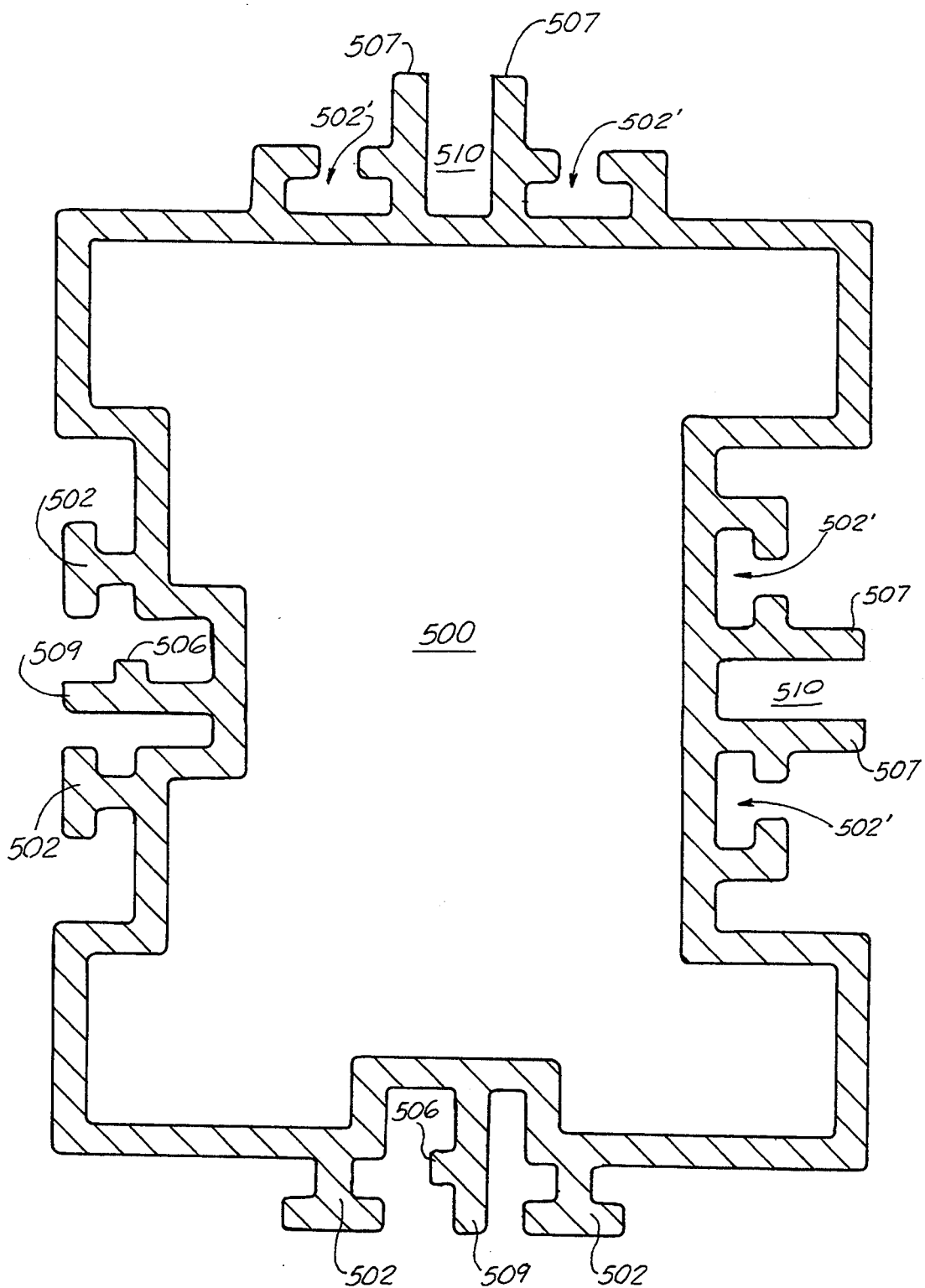
FIG. 9 is a plan view of an exemplary, "box"-shape, individual, expanded or double-walled, barrier member incorporating still another exemplary embodiment of the seal and joint system of the present invention, with one end having a male interconnecting joint element and the other end having a female, interconnecting joint element with its related sealing or gasket element.
Figure 10:
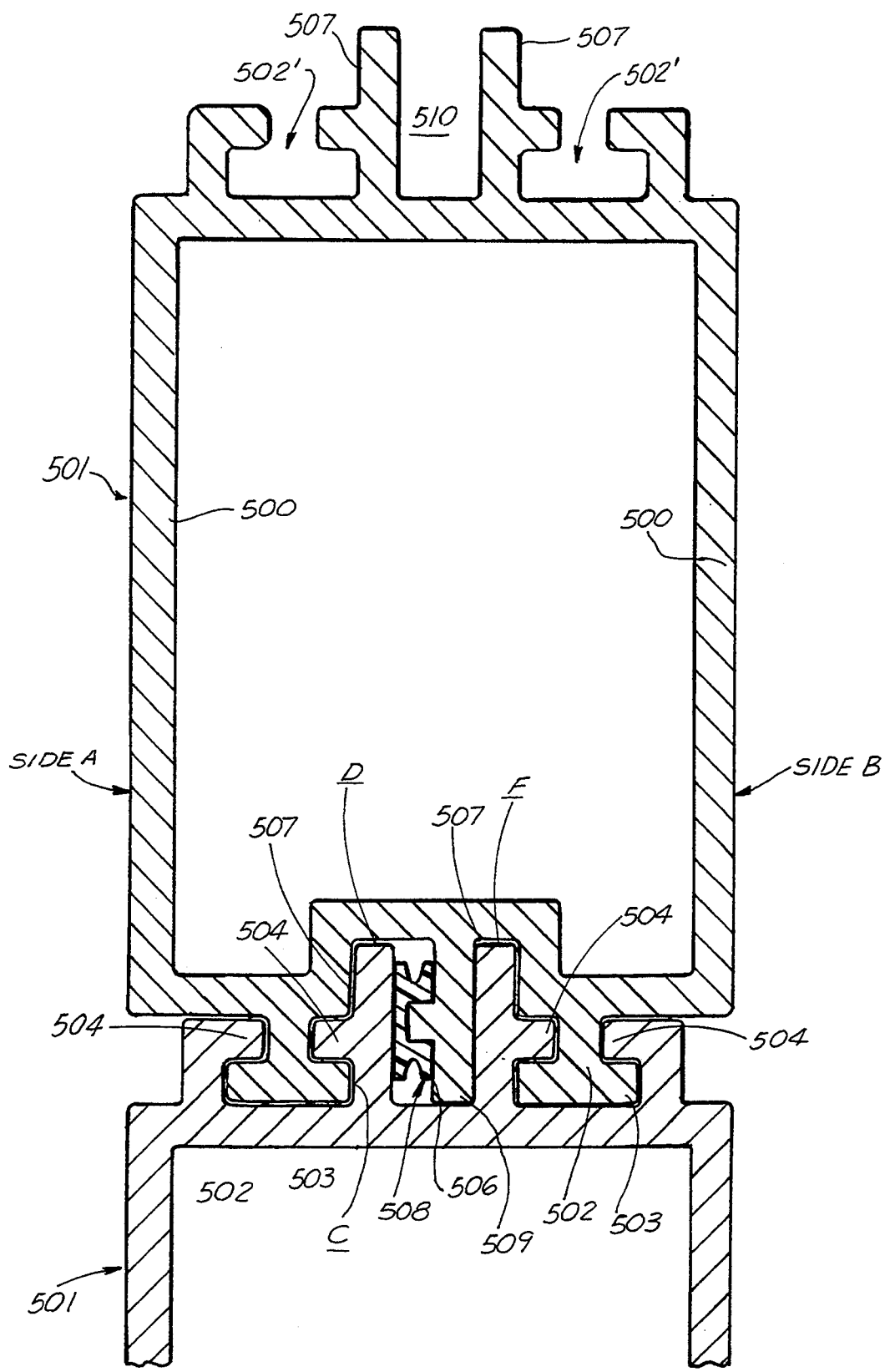
FIG. 10 is a plan view showing an assembled, sealed interconnection between two adjacent barrier members of the type of FIG. 9 using the joint and sealing elements of FIG. 9.
Figure 11:
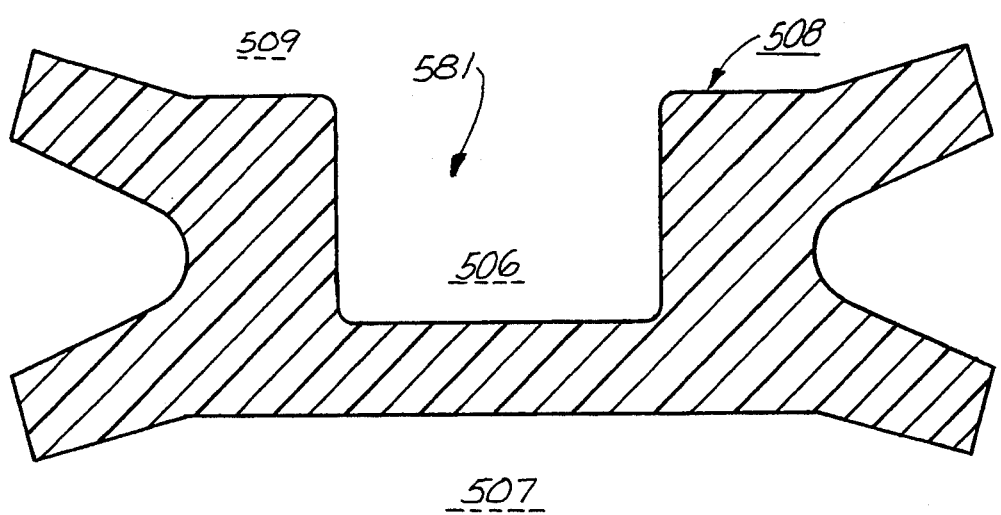
FIG. 11 is a plan, close-up view of the sealing element of FIG. 10 showing the details of the its configuration.

As in the double-wall embodiment of FIGS. 9 & 10, the joint includes an extended male member 309 (radially extended in this cylindrical embodiment), with two, "T" shaped, flanking members 302. When joined to an adjacent barrier member, the male member 309 mates and extends into the centrally located, female cavity 310, while the flanking members 302 couple with the like "T" shape configured chambers 302' formed by the joint members 304 which flank the female leg members 307.

Figure 4:
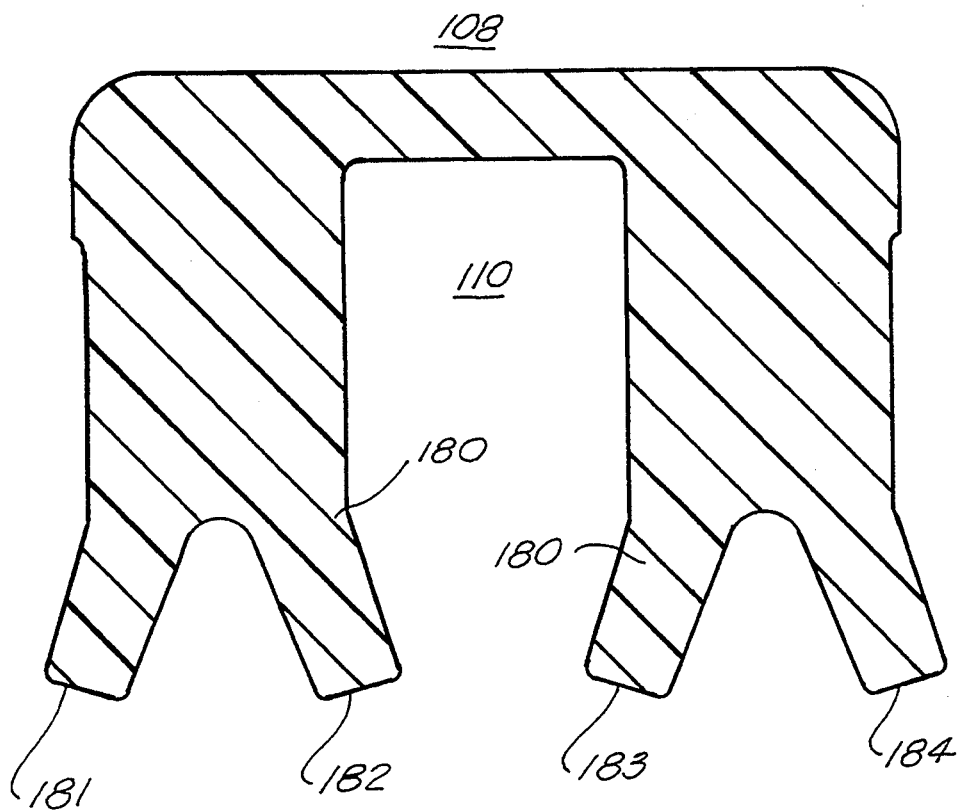
FIG. 4 is a plan, close-up view of the sealing element of FIGS. 2 & 3 showing the details of the its configuration.

The sealing gasket 308 is substantively identical to that of FIG. 4 and provides sealing action in analogous fashion to that described with respect to FIGS. 2–5.

Figure 7:
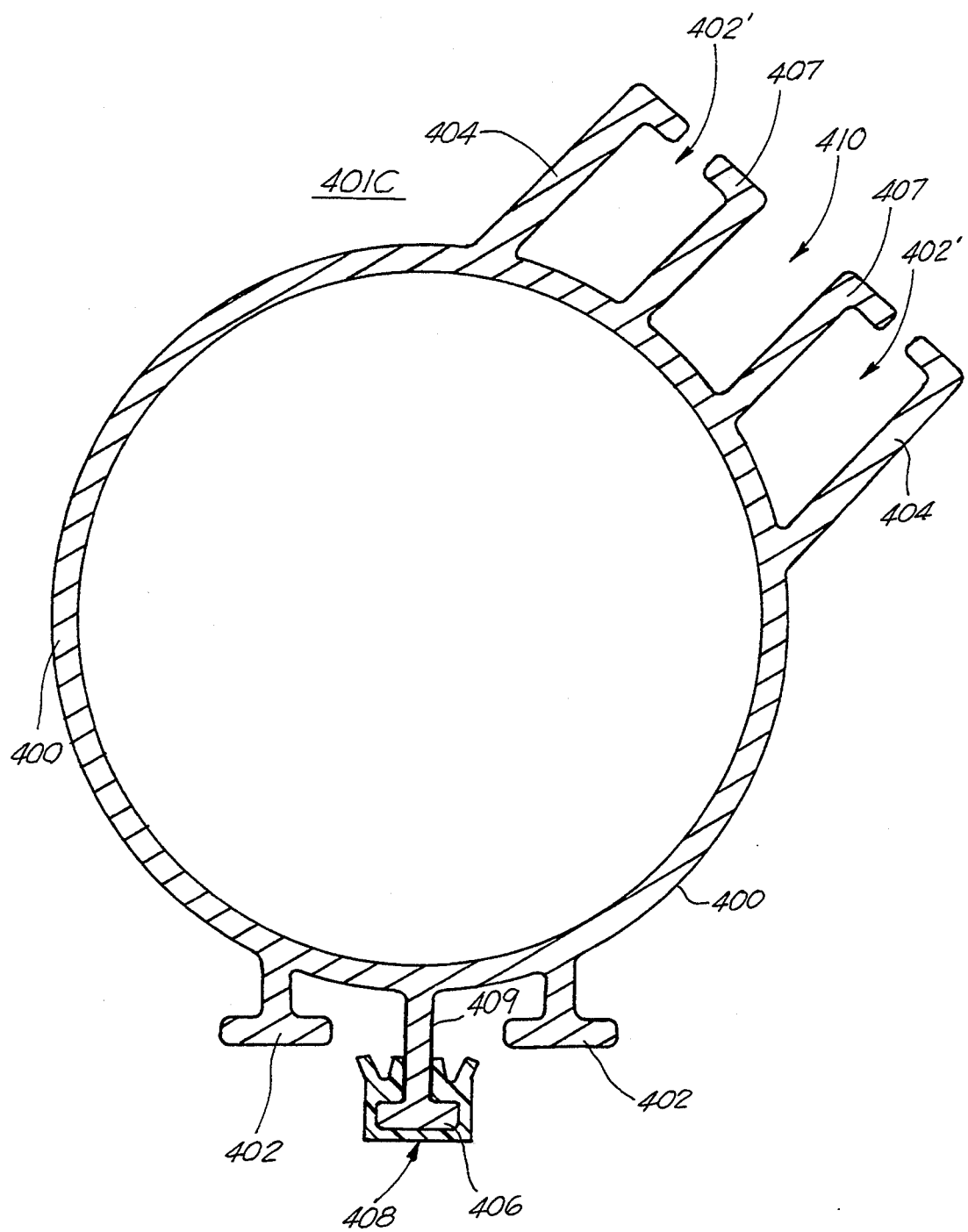
FIG. 7 is a plan view of another alternate, cylindrical-type, expanded or double-walled, barrier member incorporating another alternate embodiment of the seal and joint system of the present invention, with one peripheral area or "end" having a male interconnecting joint element and another peripheral area or "end" a female, interconnecting joint element with its related sealing or gasket element.

4th Joint/Seal Embodiment (FIG. 7)

As can be seen in FIG. 7, a fourth exemplary embodiment 401C for the containment barrier member 1 of the present invention is illustrated which is assembled into a continuous in-ground, containment wall W (see FIG. 1) with other like barrier members 401/401C. The embodiment 401C illustrated is a cylindrical, double-wall (400), corner unit, used for making an exemplary forty-five (45°) degree turn in the containment wall W, and is very similar to the embodiment 301C of FIG. 6, with the primary difference being in the placement of the sealing gasket 408 on a boss or laterally extension 406 on the distal end of the male member 409 (vis-a-vis in the bottom area of the female chamber 310).

As in the double-wall embodiments of FIG. 6 and FIGS. 9 & 10, the joint includes an extended male member 409 (radially extended in this cylindrical embodiment), with two, "T" shaped, flanking members 402. When joined to an adjacent barrier member, the male member 409 mates and extends into the centrally located, female cavity 410, while the flanking members 402 couple with the like "T" shape configured chambers 402' formed by the joint members 404 which flank the female leg members 407.

Figure 8:
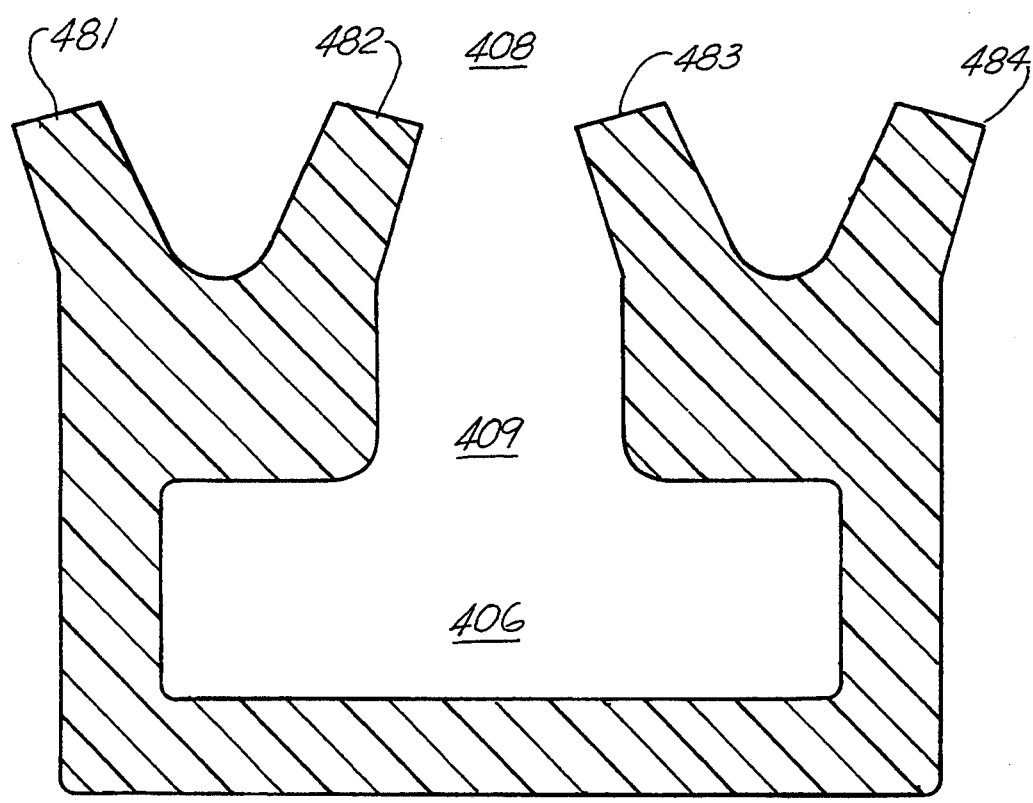
FIG. 8 is a plan, close-up view of the sealing element of FIGS. 6 & 7 showing the details of its configuration.

The sealing gasket 408 is shown in the close-up view of FIG. 8 in its "natural," un-compressed state and provides sealing action in analogous fashion to that described with respect to FIGS. 2-6, but in the reverse direction with respect to the distal end of the male member and the bottom of the female cavity.

5th Joint/Seal Embodiment (FIGS. 9 & 10)

As can be seen in FIGS. 9 & 10, a fifth exemplary embodiment 501 for the containment barrier member 1 of the present invention is illustrated which is assembled into a continuous, in-ground, containment wall W (see FIG. 1) with other like barrier members 501/501C. FIG. 9 illustrates an exemplary ninety (90°) degree corner member 501C, while FIG. 10 illustrates the coupling of two, in-line, main barrier members 501 used to form a desired length of straight section of the containment wall W.

The barrier members 501/501C, which each include a rectangular, double-wall, hollow, main body section 500, are interlocked together by means of a pair of laterally directed, interlocking members 502, 503 and 504, which form mating "T" members & cavities 502 & 502'and flank the sealed male/female coupling 509/510. These basic barrier wall elements 501/501C can be made of, for example, extruded thermoplastic made in the desired heights for the barrier members, e.g., ten (10'), fifteen (15') and twenty (20') foot heights.

It is noted that the cylindrical double-wall type of barrier member provides better rigidity under earth loads, particularly when its walls are curved, as in the embodiments of FIGS. 6 & 7, due to their arc shaped. If so desired, double-wall elements and single wall elements could be combined in the same containment wall W. For example, a double wall corner unit (e.g. 301C) could be used with single wall sheet units (e.g. 101), as long as their male/female inter-connectors were compatibly designed.

With reference to FIG. 10, when a force is applied to side B of the assembled structure 501/501, the resultant bending causes central members 502 to be stressed in tension, while interdigitating members 503 and 504 are stressed in shear. Since the shear strength of a material is typically about one-half of its tensile strength, interdigitating members 503 and 504 preferably are designed to provide twice the area in shear as compared to the area in tension in the centrally contained, "T" shaped member 502.

As can be seen in FIG. 10, barrier members 501 employing the same design are included on the opposite sides interconnected together to form a complete barrier of the size and configuration desired. This design provides a joint having essentially the same strength as the body member 500.

In order to prevent passage of fluid through the joint, an elastomeric gasket 508, preferably of the type known as U-packing and shown in the close-up view of FIG. 11 in its "natural," un-compressed state, is placed in the side cavity formed between the longitudinally extended male member 509 and an opposed one of the longitudinally extended, flanking members 507, which extend parallel and along side the male member forming the female cavity 510. As noted above, the elastomeric material chosen for the gasket depends on the fluid being retained, with, for example, buna-n rubber being very suitable for water, but vinylidene fluoride hexaflouropropylene copolymer (e.g. "Viton" TM), for example, being preferred where corrosive chemicals are involved.

As can be seen in FIG. 10, the gasket 508 includes two seals formed back to back, sealing a gap between the male member 509 and an opposed one of said female cavity members or legs 507, so that pressure can be restrained in either direction. A groove, typically about thirty-seven hundredths (0.37") of an inch wide by twenty-five hundredths (0.25") of an inch deep, is provided in order to locate and hold the gasket 508 in place over the laterally directed member or boss 506, which interfaces with the gasket slot 581. The gasket 508 thus rides on the boss 506 and, through the boss, on the side of the male member 509.

Although the presence of the boss slot 580 makes the gasket have somewhat of a "U" shaped configuration with the lips then being described as extending out from the sides of the "U" shape, the gasket more accurately may be considered to have an extended, straight shape, with the lips extending directly out from the distal ends of the extended, straight shape.

In order to further prevent or at least retard any movement of the gasket 508 during installation, the gasket is secured in place by means of, for example, an adhesive. Installation of two adjacent, engaged barrier members 501 is accomplished by sliding the members together with their respective male/female members 509/510 and their respective side, flanking "T" members 502/502' mated and engaged.

Beveling the edges of the members 507 and applying, for example, a coating of vegetable soap to the gasket 508 facilitates assembly.

Assembly is further facilitated by providing a sufficient gap or loose fit between members 502,503 and 504 to minimize frictional forces. The gap should preferably be in the range of fifteen thousandths (0.015") to thirty thousandths (0.030") of an inch.

This gap allows one barrier member 501 to move in relation to the one to which it is coupled. This movement has no effect on the seal, as the gasket 508 moves inward or outward in the cavity formed between the male member 509 and its opposed member 507, and a tight seal is maintained regardless of its position in the cavity.

The initial seal of the gasket 508 is caused by compression of the gasket lips between the members 509 and 507. As pressure is applied to the internal U-shaped cavity, the seal becomes tighter.

In addition, when pressure is applied from side A, the pressure acting over the region C-D causes the nearest member 507 to deflect against the sealing gasket 508, causing a tighter seal. Similarly, when the pressure is applied from side B, pressure applied over the region E-F causes the centralized male member 509 to deflect against the gasket, also providing a tighter seal.

Figure 12:
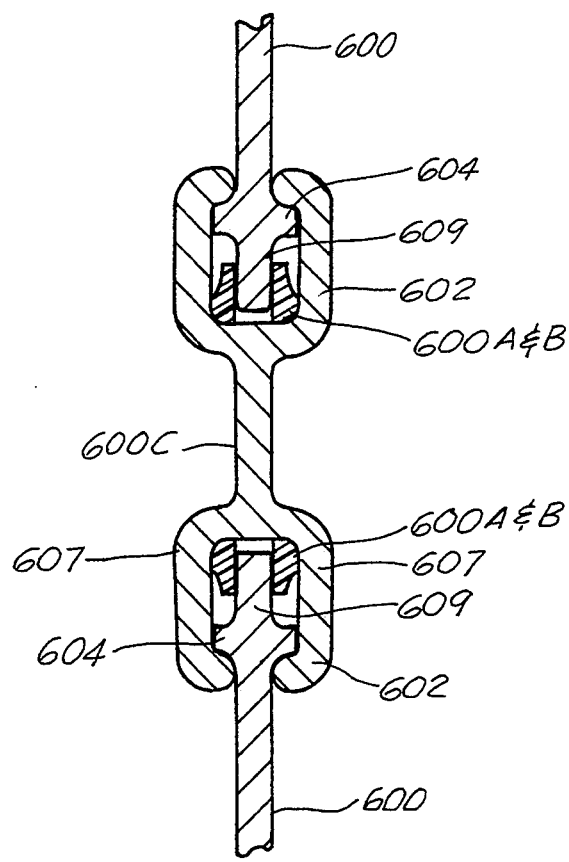
FIG. 12 is a plan view showing an assembled, sealed interconnection between two adjacent barrier members using still another, alternate, exemplary form of joint and sealing elements including a double-headed coupling element for interconnecting adjacent flat or sheet-type barriers each having the same type of joint element at its opposite ends which interface and mate with the opposed, double heads of the coupler.
Figure 12:
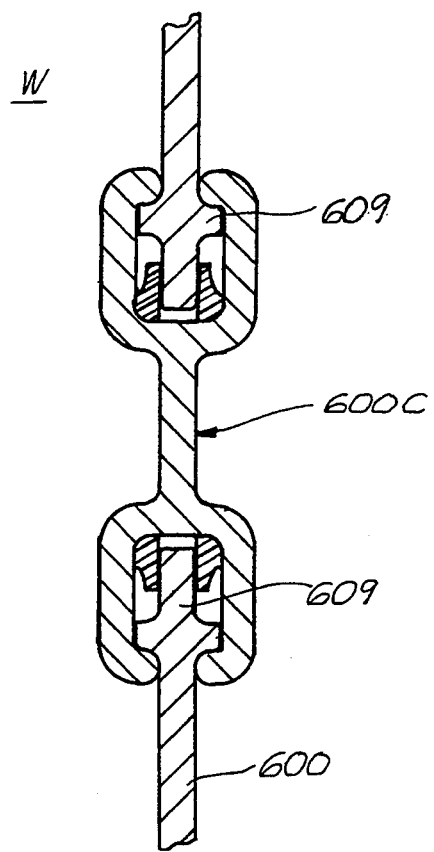

6th Joint/Seal Embodiment (FIG. 12)

As can be seen in FIG. 12, a sixth exemplary embodiment 601 for the containment barrier member 1 of the present invention is illustrated which is assembled into a continuous, in-ground, containment wall W (see FIG. 1) with other like barrier members 601/601C. However, unlike the other five embodiments in which the coupling members are either integral or permanently affixed to the main body of the barrier members, in this embodiment the male/female coupling is provided through a separate or separable, double-ended coupling member 600C, which couples with the distal ends of the main body element 600, which has the same type of mating element (e.g. "male" as illustrated) at both of its distal, end edges.

Additionally, the embodiment 601 illustrated is of the single-wall thickness design of the same general type illustrated in FIGS. 2-3 and 5. However, in this embodiment, as briefly alluded to above, the main body section 600 has at both of its distal end edges a male member 609, each of which in a mating fashion extends into an opposed, female cavity formed by the flanking, opposed, inwardly directed, "J" shaped joint extensions 602. The latter are presented at the distal end edges of the separate coupling member 600C, which also contain opposed, vertically extended, double sealing gasket members 608A & B.

Two, laterally extending, joint elements or tabs 604 extend laterally out away from the sides of each of the male members 609, forming with its respective male member somewhat of a "T" or cross shape. These joint elements or tabs engage and are held by the opposed "J" shaped extensions 602 in each end of the coupling member 600C. The tabs 604 can be either integrally extruded with the main body of the unit, as illustrated, or separately welded on, as desired.

The opposed gasket sections 608A & B form a double seal between the sides of their respective male member 609 and the interior sides of the longitudinally extended female cavity legs 607. An exemplary material for the sealing members 608A & B is "Santoprene" TM.

A particular advantage of this embodiment is that the body of the coupler element 600C and the sealing members 608A & B can be co-extruded together through the same die, providing enhanced economy, time savings and simplicity in the manufacturing process. This also significantly reduces the cost of providing the gasket or sealing materials, because the so co-extruded sealing materials 608A & B are substantially less expensive than separately manufactured, off-the-shelf gaskets, which then must be added into the coupling members in a separate, assembly operation.

Figure 13:
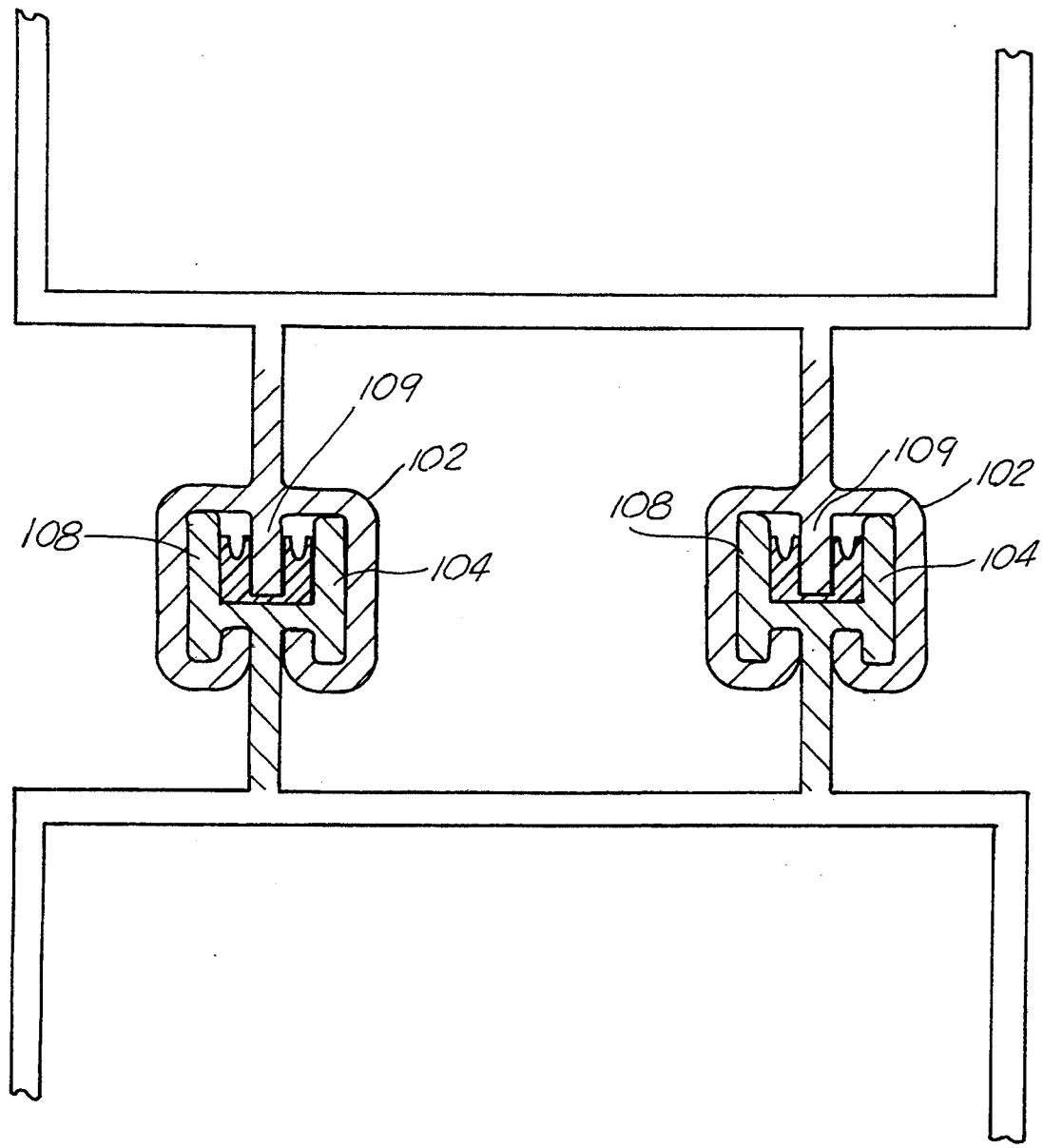
FIG. 13 is a plan view showing an assembled, sealed interconnection between two adjacent juxtaposed wall panels of the present invention using still another, alternate, exemplary form of joint and sealing elements, with one end having two male interconnecting joint elements and the other end having two female, interconnecting joint elements with their related sealing or gasket element.

7th Joint/Seal Embodiment (FIG. 13)

As can be seen in FIG. 13, it is noted that the seventh exemplary embodiment basically represents a combination or hybrid of the joint/seal version of FIGS. 2 and 3, but provided in flanked, duplicate with a double wall embodiment for the basic wall structure. Because the structures of each of them have been fully described in the foregoing, they will not be duplicated here in order to avoid redundancy.

It is noted that the six embodiments described herein in detail for exemplary purposes are of course subject to many different variations in structure, design, application and methodology. Because many varying and different embodiments may be made within the scope of the inventive concept(s) herein taught, and because many modifications may be made in the embodiments herein detailed in accordance with the descriptive requirements of the law, it is to be understood that the details herein are to be interpreted as illustrative and not in a limiting sense.

We claim:

1. An in-ground, barrier containment wall made up of a multiple number of wall members joined together at vertically extended joints, comprising:

first and second in-ground barrier members forming part of a containment wall in the ground, isolating one part of the ground on one side of said wall from a part of the ground on the opposite side of said containment wall, each of said in-ground barrier members having a main body having a top and bottom, first and second sides, and first and second edges, said first and second edges having engaged thereto first and second interlocking members, respectively, said first interlocking member engaged said first edge of said first in-ground barrier member configured to slidingly engage and join in sealing fashion, said second interlocking member engaged to said second edge of said second in-ground barrier member, forming a vertically extended joint between said barrier members;

said vertically extended joint between said barrier members including two substantially parallel, longitudinally extended leg members forming between them a longitudinally extended female cavity, a "T" configured member interfacing with said leg members; and a centrally located, longitudinally extended male member disposed within said longitudinally extended female cavity formed by said longitudinally extended leg members;

double sealing gasket means located within said female cavity, contacting and separately sealing two spaced areas located on opposite side areas of said male member and said leg member.

2. The in-ground barrier containment wall of claim 1, wherein:

said double sealing gasket is a "U" shaped gasket having a pair of outwardly diverging lips at the terminal ends of its "U" shape, which provide the double seals.

3. The in-ground barrier containment wall of claim 2, wherein:

said "U" shaped gasket includes a central slot interfacing with a laterally extending boss located on said male member, said gasket riding on said male member through said boss.

4. The in-ground barrier containment wall of claim 2, wherein:

said longitudinally extended male member has a distal, terminal end, and said female cavity has a bottom area;

and wherein:

said "U" shaped gasket is located between said distal end and said bottom area, sealing a gap between said distal end and said bottom area.

5. The in-ground barrier containment wall of claim 2, wherein:

said longitudinally extended male member has a longitudinally extended, male side, and said female cavity has a longitudinally extended, female side opposed to and extended parallel along side said male side;

and wherein:

said "U" shaped gasket is located between said male side and said female side, sealing a gap between the two sides.

6. The in-ground barrier containment wall of claim 5, wherein there is further included:

a laterally extended, rigid, integral boss located between said male side and said female side, said gasket riding on said boss holding it in place between the male and female sides.

7. The in-ground barrier containment wall of claim 2, wherein:

said gasket has opposed, diverging lips extending out from the distal ends of its "U" shape forming oppositely directed seals between opposed sides of said male member and opposed ones of said flanking, female cavity legs.

8. The in-ground barrier containment wall of claim 2, wherein:

said gasket has opposed, diverging lips extending out from opposite sides of the distal ends of its "U" shape forming oppositely directed seals between one side of said male member and an opposed, interior side of one of said flanking, female cavity legs.

9. The in-ground barrier containment wall of claim 1, wherein:

said barrier members having at their side edges the same type of male/female couplers;

and wherein there is further included:

two separable coupling members associated with each barrier member, each said coupling members having at their side edges the same type of male/female couplers, but of the opposite type than the couplers on said barrier members; the couplers on said barrier members engaging in mating fashion the couplers on the associated coupling members.

10. A method of joining a series of barrier members together in an in-ground environment to form an in-ground containment wall and sealing the joints between the barrier members, comprising the following steps:

(a) providing first and second in-ground barrier members forming part of a containment wall in the ground, isolating one part of the ground on one side of said wall from a part of the ground on the opposite side of said containment wall, each of said in-ground barrier members having a main body having a top and bottom, first and second sides, and first and second edges, said first and second edges having engaged thereto first and second interlocking members, respectively, said first interlocking member engaged said first edge of said first in-ground barrier member configured to slidingly engage and join in sealing fashion, said second interlocking member engaged to said second edge of said second in-ground barrier member, forming a vertically extended joint between said barrier members;

said vertically extended joint between said barrier members including
two substantially parallel, longitudinally extended leg members forming between them a longitudinally extended female cavity,
a flanking joint member interfacing with said leg members forming a secure joint; and
a centrally located, longitudinally extended male member disposed within said longitudinally extended female cavity formed by said longitudinally extended leg members;
double sealing gasket means located within said female cavity contacting and extending up along at least one side of said male member; and (b) using said double sealing gasket means to separately seal said leg member at two spaced areas contacting and located on at least one side of said male member with at least one of said leg members, with an unsealed area located in-line between said spaced areas.

11. The method of claim 10, wherein:
in step "a" there is included the step of providing the double sealing gasket means in the form of an extended gasket having a pair of diverging lips at each of its two, extended ends;
and wherein:
in step "b" there are included the steps of using and compressing each of said pair of diverging lips to form the seals at said two spaced areas.

12. The method of claim 11, wherein:
in step "a" there is included the steps of providing the double sealing gasket means in the form of a "U" shaped, extended gasket having a pair of diverging lips at each of its two, distal ends and placing the gasket means at the bottom of the female cavity with the male member extending into the interior of the "U" shape;
and wherein:
in step "b" there are included the steps of using and compressing each of said pair of diverging lips to form the seals at said two spaced areas, with one located on one side of said male member and the other located on the opposite side of said male member, with the two seals being made with two, separate ones of said legs.

13. The method of claim 11, wherein:
in step "a" there is included the steps of providing the double sealing gasket means in the form of an extended, straight gasket having a pair of diverging lips at each of its two, distal, opposite ends and placing the gasket means at along side one side of said male member between it and one of said legs;
and wherein:
in step "b" there are included the steps of using and compressing each of said pair of diverging lips to form the seals at said two spaced areas, with both located on the same side of said male member with the two seals being made with the same leg.

14. An in-ground, barrier containment wall made up of a multiple number of wall members joined together at vertically extended joints, comprising:
first and second in-ground barrier members forming part of a containment wall in the ground, isolating one part of the ground on one side of said wall from a part of the ground on the opposite side of said containment wall, each of said in-ground barrier members having a main body having a top and bottom, first and second sides, and first and second edges, said first and second edges having emanating therefrom first and second interlocking members, respectively, said first interlocking member emanating from said first in-ground barrier member configured to slidingly engage and join in sealing fashion, said second interlocking member emanating with said second edge of said second in-ground barrier member, forming a vertically extended joint between said barrier members;

said vertically extended joint between said barrier members including
two substantially parallel, longitudinally extended leg members forming between them a longitudinally extended female cavity,
a flanking joint member interfacing with said leg members; and
a centrally located, longitudinally extended male member disposed within said longitudinally extended female cavity formed by said longitudinally extended leg members;
double sealing gasket means located within said female cavity, contacting and separately sealing two spaced areas located on at least one side of said extended male member with at least one of said leg members with an unsealed area located in-line between said spaced areas, said gasket means further including an extended gasket having a pair of diverging lips at each one of its distal ends, the outer side tips of each pair of lips forming one and the other of the seals at said two spaced areas, increasing exterior fluid pressure on either end of said double sealing gasket means causing said lips facing the increasing pressure to flex into further divergence, tightening their respective seal at their respective one of said space areas.

15. The in-ground barrier containment wall of claim 14, wherein:
said double sealing gasket is a "U" shaped gasket having a pair of outwardly diverging lips at each one of its terminal, distal ends of its "U" shape, which provide the double seals.

16. The in-ground barrier containment wall of claim 15, wherein:
said "U" shaped gasket includes a central slot interfacing with at least one laterally extending boss located on said male member, said gasket riding on and carried by said male member through said boss.

17. The in-ground barrier containment wall of claim 15, wherein:
said longitudinally extended male member has a distal, terminal end, and said female cavity has a bottom area;
and wherein:
the bottom of said "U" shaped gasket is located between said distal end of said male member and said bottom area with the distal end of said male member being nested in the interior of said "U" shape, said gasket sealing two gaps between opposite sides of said extended male member and the opposed, interior walls of said legs, respectively.

18. The in-ground barrier containment wall of claim 15, wherein:
said diverging lips extend out from the distal ends of the "U" shape of said gasket, forming oppositely directed seals between opposite sides of said male member and opposed ones of said flanking, female cavity legs.

19. The in-ground barrier containment wall of claim 14, wherein:
said gasket has opposed, diverging lips extending out from opposite sides of the distal ends of its extended shape, forming oppositely directed seals between one side of said male member and an opposed, interior side of one of said flanking, female cavity legs.

20. The in-ground barrier containment wall of claim 14, wherein:
said longitudinally extended male member has a longitudinally extended, male side, and said female cavity has a longitudinally extended, female side opposed to and extended parallel along side said male side;
and wherein:
said extended gasket is straight and is located between said male side and said female side, sealing at two, spaced locations a gap between the two sides, the two seals at said spaced areas being located on the same side of said male member.

21. The in-ground barrier containment wall of claim 14, wherein:
the joint between two adjacent barrier members includes an "H" shaped joint element and a second, opposed joint element having two, opposed, inwardly directed, "J" shaped elements, mated and coupled together, said "H" shaped element fitting and nesting within the opposed, "J" shaped elements, with the tips of the "Js" curving around and holding in the lower legs of the "H".

22. The in-ground barrier containment wall of claim 15, wherein:
said extended male member is centrally located sandwiched between the legs of said "J" shaped members on the outside and the legs of the "H" shaped elements between the male member and the interior sides of the legs of said "J" shaped elements, forming a sandwich of five, parallel, flat elements.

23. The in-ground barrier containment wall of claim 14, wherein:
the joint between two adjacent barrier members includes a "U" shaped joint element and a second, opposed joint element having a "C" shape, mated and coupled together, said "U" shaped element fitting and nesting within the "C" shape of said opposed joint element.

24. An in-ground, barrier containment wall made up of a multiple number of wall members joined together at vertically extended joints, comprising:
first and second in-ground barrier members forming part of a containment wall in the ground, isolating one part of the ground on one side of said wall from a part of the ground on the opposite side of said containment wall, each of said in-ground barrier members having a main body having a top and bottom, first and second sides, and first and second edges, said first and second edges having engaged thereto first and second interlocking members, respectively, said first interlocking member from said first edge of said first in-ground barrier member configured to slidingly engage and join in sealing fashion, said second interlocking member from said second edge of said second in-ground barrier member, forming a vertically extended joint between said barrier members;
said first interlocking member comprising first and second sides corresponding to said first and second sides of said barrier member to which said first interlocking member is engaged, said first interlocking member further comprising first and second, substantially parallel, longitudinally extended leg members, said first leg member emanating from said first side of said interlocking member, said second leg member emanating from said second side of said interlocking member, said first and second leg member configured to form between them a longitudinally extended female cavity having a base situated generally where said first and second leg members emanate from said interlocking member, and an open area, the ends of said first and second leg members generally turned generally toward each other said ends spaced from one another forming the open area of said longitudinally extended female cavity, said base having emanating therefrom a longitudinally extending linear male member partially dividing said female cavity formed between said first and second leg members,
said second interlocking member having first and second sides corresponding with said first and second sides of said member to which said second interlocking member is engaged, said second interlocking member comprising first and second "T" configured members, said first "T" configured member emanating from said first side of said interlocking member, said second "T" configured member emanating from said second side of said interlocking member; and
double sealing gasket means located within said female cavity, contacting and separately sealing two spaced areas located on opposite side areas of said male member and at least one of said leg members.

25. An in-ground, barrier containment wall made up of a multiple number of wall members joined together at vertically extended joints, comprising:
first and second in-ground barrier members forming part of a containment wall in the ground, isolating one part of the ground on one side of said wall from a part of the ground on the opposite side of said containment wall, each of said in-ground barrier members having a main body having a top and bottom, first and second sides, and first and second edges, said first and second edges having engaged thereto first and second interlocking members, respectively, said first interlocking member from said first edge of said first in-ground barrier member configured to slidingly engage and join in sealing fashion, said second interlocking member from said second edge of said second in-ground barrier member, forming a vertically extended joint between said barrier members;
said first interlocking member comprising first and second sides corresponding to said first and second sides of said barrier member to which said first interlocking member is engaged, said first interlocking member further comprising first and second, substantially parallel, longitudinally extended leg members, said first leg member emanating from said first side of said interlocking member, said second leg member emanating from said second side of said interlocking member, said first and second leg member configured to form between them a longitudinally extended female cavity having a base and an open area, the ends of said first and second leg members generally turned generally toward each other said ends spaced from one another forming the open area of said longitudinally extended female cavity, said base having emanating therefrom a longitudinally extending linear male member partially dividing said female cavity formed between said first and second leg members, and said second interlocking member having first and second sides corresponding with said first and second sides of said member to which said second interlocking member is engaged, said second interlocking member comprising first and second flanking joint members, said first joint member emanating from said first side of said interlocking member, said second joint member emanating from said second side of said interlocking member, said first and second joint members emanating from opposite sides of said male member and interfacing with said leg members; and double sealing gasket means located within said female cavity, contacting and separately sealing two spaced areas located on at least one side of said extended male member with at least one of said leg members with an unsealed area located in-line between said spaced areas, said gasket means further including an extended gasket having a pair of diverging lips at each one of its distal ends, the outer side tips of each pair of lips forming one and the other of the seals at said two spaced areas, increasing exterior fluid pressure on either end of said double sealing gasket means causing said lips facing the increasing pressure to flex into further divergence, tightening their respective seal at their respective one of said space areas.

* * * * *